US010189399B2

(12) United States Patent
Rae

(10) Patent No.: US 10,189,399 B2
(45) Date of Patent: Jan. 29, 2019

(54) INTEGRATION OF DEPTH MAP DEVICE FOR ADAPTIVE LIGHTING CONTROL

(71) Applicant: STMicroelectronics (Research & Development) Limited, Buckinghamshire (GB)

(72) Inventor: Bruce Rae, Edinburgh (GB)

(73) Assignee: STMICROELECTRONICS (RESEARCH & DEVELOPMENT) LIMITED, Buckinghamshire (GB)

( * ) Notice: Subject to any disclaimer, the term of this patent is extended or adjusted under 35 U.S.C. 154(b) by 0 days.

(21) Appl. No.: 15/789,026

(22) Filed: Oct. 20, 2017

(65) Prior Publication Data

US 2018/0236927 A1 Aug. 23, 2018

(30) Foreign Application Priority Data

Feb. 22, 2017 (EP) .................................... 17157491

(51) Int. Cl.

| | |
|---|---|
| ***B60Q 1/14*** | (2006.01) |
| ***B60Q 1/00*** | (2006.01) |
| ***G01S 17/89*** | (2006.01) |
| ***G01S 17/10*** | (2006.01) |
| ***G01S 17/93*** | (2006.01) |
| ***G01S 7/481*** | (2006.01) |
| ***H05B 37/02*** | (2006.01) |

(52) U.S. Cl.

CPC ........... *B60Q 1/143* (2013.01); *B60Q 1/0023* (2013.01); *G01S 7/4813* (2013.01); *G01S 17/89* (2013.01); *H05B 37/0227* (2013.01); *G01S 7/4816* (2013.01); *G01S 17/10* (2013.01); *G01S 17/936* (2013.01)

(58) Field of Classification Search

CPC ................................ B60Q 1/143; G01S 17/89
USPC ............................................................ 315/82
See application file for complete search history.

(56) References Cited

U.S. PATENT DOCUMENTS

| | | | | |
|---|---|---|---|---|
| 9,069,075 | B2 * | 6/2015 | Zeng | G01S 17/58 |
| 9,608,027 | B2 * | 3/2017 | Sun | H01L 27/14647 |
| 9,778,361 | B2 * | 10/2017 | Tsukamoto | G01S 17/10 |
| 9,823,339 | B2 * | 11/2017 | Cohen | G01S 7/486 |
| 9,823,352 | B2 * | 11/2017 | Meinherz | G01S 17/08 |
| 9,841,496 | B2 * | 12/2017 | Hudman | G01S 7/4865 |
| 9,900,581 | B2 * | 2/2018 | Gruenwald | H04N 13/0253 |
| 9,906,774 | B2 * | 2/2018 | Cho | H04N 13/0207 |

(Continued)

FOREIGN PATENT DOCUMENTS

| | | | |
|---|---|---|---|
| DE | 102010032761 | A1 | 2/2012 |
| DE | 202014104825 | U1 | 1/2016 |

(Continued)

OTHER PUBLICATIONS

OSRAM Opto Semiconductors, "Bringing LED Efficiency to New Heights—OSRAM's UX:3 Chip Technology", Apr. 22, 2010, 2 pages.

*Primary Examiner* — Dylan C White
(74) *Attorney, Agent, or Firm* — Slater Matsil, LLP

(57) ABSTRACT

A light system includes at least one time-of-flight image sensor configured to generate at least one zone distance measurement. At least one control unit is configured to receive the at least one zone distance measurement and to generate at least one control signal based on the at least one zone distance measurement. At least one light unit is configured to adapt an output of the light unit based on the at least one control signal.

24 Claims, 6 Drawing Sheets

201
203
211
213
215
217
219

501
521
523
525
511
513
515
517
531
541

(56) References Cited

U.S. PATENT DOCUMENTS

| | | | | |
|---|---|---|---|---|
| 9,921,300 | B2 * | 3/2018 | Galera | G01S 7/4863 |
| 2013/0235364 | A1 * | 9/2013 | Kyung | G01S 17/50<br>356/5.01 |
| 2017/0315238 | A1 * | 11/2017 | Nagai | G01S 17/08 |
| 2018/0091784 | A1 * | 3/2018 | Dutton | H04N 9/3155 |

FOREIGN PATENT DOCUMENTS

| | | | | |
|---|---|---|---|---|
| WO | 2007072285 | A1 | 6/2007 | |
| WO | WO 2009059464 | A1 * | 5/2009 | H05B 33/0863 |
| WO | 2015176953 | A1 | 11/2015 | |
| WO | WO 2016154869 | A1 * | 10/2016 | G01S 17/36 |
| WO | 2017023208 | A1 | 2/2017 | |
| WO | WO 2017045450 | A1 * | 3/2017 | G06F 9/445 |

* cited by examiner 501
511
513
515
517
521
523
525
531
541

INTEGRATION OF DEPTH MAP DEVICE FOR ADAPTIVE LIGHTING CONTROL

CROSS-REFERENCE TO RELATED APPLICATIONS

This application claims priority to European Patent Application No. 17157491.6, filed on Feb. 22, 2017, which application is hereby incorporated herein by reference.

TECHNICAL FIELD

Some embodiments relate to an apparatus, and in particular but not exclusively, to an apparatus integrating depth map sensor functionality with adaptive lighting control.

BACKGROUND

Lighting systems are known and widely implemented for many various applications. For example lighting systems may be used in industrial, commercial, residential, or other leisure environments. Such lighting systems are rapidly being converted into 'smart' systems whereby a central controller may be configured to receive inputs from sensors such as passive infra-red sensors configured to determine a 'warm' body entering or moving within a room and control a lighting system to light up a room. Such systems are currently limited in that they generally may only determine the presence or absence of 'objects' of interest within the field of view of the detector.

More complex systems may employ a camera or array of cameras configured to capture images which may then be analyzed to determine the presence of 'objects' and furthermore in some systems the type of the object, the direction of motion of the object or similar. However the implementation of image sensors sensitive to capture images with sufficient detail to enable such processing and the implementation of suitable processing means to process the images significantly raises the cost or 'bill of materials' of such systems and also increases the power consumption of as such and the lighting system.

Furthermore lighting systems are further using more intelligent light units. For example 'pixelated' light unit can be configured to adapt or adjust the pattern (or throw) of the generated light as well as being able to adapt or adjust the level of lighting. It is able to perform these operations by adjusting the light generated by pixels or by switching on and off pixels within the lighting system. An example of such a pixelated light unit is the OSRAM UX:3 technology.

These adaptive light systems have also been employed in automotive or vehicular light systems as well as conventional static systems. In such systems the ability to monitor the scene and allow the lighting to be adapted based on the results of the analysis is a goal for many research projects.

SUMMARY

According to a first aspect, a light system comprises at least one time-of-flight image sensor configured to generate at least one zone distance measurement. At least one control unit is configured to receive the at least one zone distance measurement and to generate at least one control signal based on the at least one zone distance measurement. At least one light unit is configured to adapt an output of the light unit based on the at least one control signal.

The at least one time-of-flight image sensor may be physically integrated within the at least one light unit.

The at least one time-of-flight image sensor may be physically integrated within the at least one control unit.

The at least one time-of-flight image sensor may be further configured to generate multiple zone distance measurements, wherein the zone distance measurements may be arranged in a determined spatial arrangement.

The determined spatial arrangement may be at least one of a linear array of spatial measurement zones, a regular two dimensional array of spatial measurement zones, or an irregular two dimensional array of spatial measurement zones.

At least one light unit configured to adapt the output of the light unit based on the at least one control signal may be configured to adapt at least one of: a light intensity output based on the at least one control signal, a light color output based on the at least one control signal, and a light pattern output based on the at least one control signal.

The at least one light unit may be a pixelated light unit.

The at least one time-of-flight image sensor may comprise at least one array of single photon avalanche diodes.

According to a second aspect, a method for controlling a light system comprises generating at least one zone distance measurement using at least one time-of-flight image sensor, generating at least one control signal using at least one control unit having based on a received at least one zone distance measurement, and adapting an output of at least one light unit based on the at least one control signal.

The method may further comprise physically integrating the at least one time-of-flight image sensor within at least one of: the at least one light unit and the at least one control unit.

Generating at least one zone distance measurement may comprise generating multiple zone distance measurements, wherein the zone distance measurements may be arranged in a determined spatial arrangement.

The determined spatial arrangement may be at least one of: a linear array of spatial measurement zones; a regular two dimensional array of spatial measurement zones; an irregular two dimensional array of spatial measurement zones.

Adapting an output of at least one light unit based on the at least one control signal may comprise at least one of: adapting a light intensity output of the at least one light unit based on the at least one control signal, adapting a light color output of the at least one light unit based on the at least one control signal, and adapting a light pattern output of the at least one light unit based on the at least one control signal.

The at least one light unit may be a pixelated light unit.

The at least one time-of-flight image sensor may comprise at least one array of single photon avalanche diodes.

BRIEF DESCRIPTION OF THE DRAWINGS

Some embodiments will now be described by way of example only and with reference to the accompanying Figures in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

The concept as employed herein is a system which integrates a suitable controllable light unit with a time-of-flight (ToF) image sensor. In some embodiments the concept covers the implementation of a time-of-flight single photon avalanche diode (ToF SPAD) sensor and a multiple zone or region ToF SPAD sensor configured to determine not only the presence of objects within the lighting scene but also the distance from the lighting system to the object. This information can then be used by a control entity to adaptively control a light unit within the lighting system.

In other words the concept involves the analysis of a lighting scene by a (multiple zone) Time-of-flight image sensor and using the multi-zone depth map information (on persons or objects within the scene) to provide a more intelligent light adaptation. For example in some embodiments the multi-zone depth map information from a ToF SPAD sensor may be received by a controller to make intelligent decisions on how the room or scene should be illuminated using a pixelated light unit.

Devices for determining the distance to objects using a method called "Time of Flight" (ToF) which is described herein is known. This method comprises sending a light signal towards the object and measuring the time taken by the signal to travel to the object and back. The calculation of the time taken by the signal for this travel may be obtained by measuring the phase shift between the signal coming out of the light unit and the signal reflected from the object and detected by a light sensor. Knowing this phase shift and the speed of light enables the determination of the distance to the object.

Single photon avalanche diodes (SPAD) may be used as a detector of reflected light. In general an array of SPADs is provided as a sensor in order to detect a reflected light pulse. A photon may generate a carrier in the SPAD through the photo electric effect. The photo generated carrier may trigger an avalanche current in one or more of the SPADs in an SPAD array. The avalanche current may signal an event, namely that a photon of light has been detected.

Figure 1:
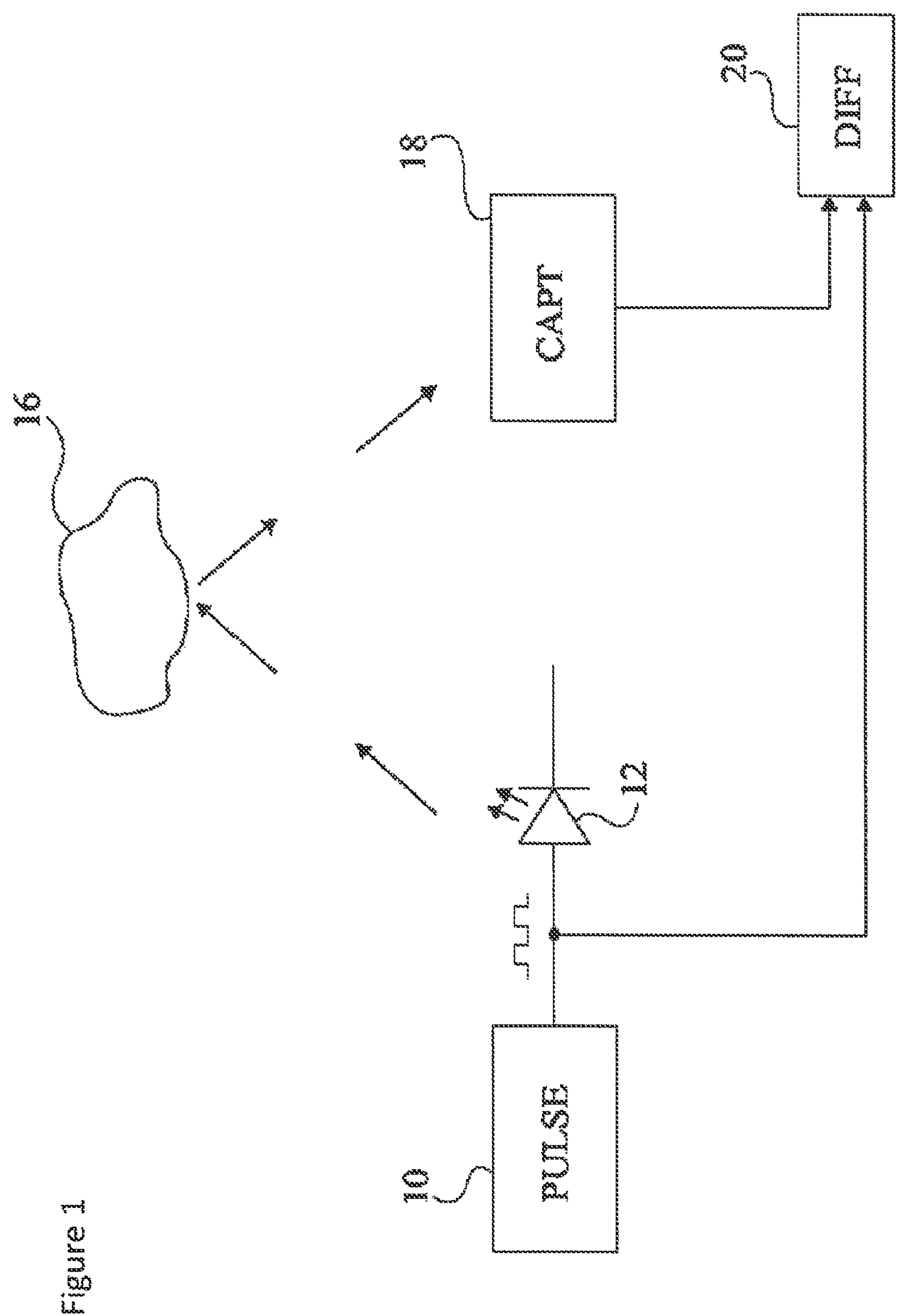
FIG. 1 illustrates a principle of the "Time of Flight" method for determining the distance to an object.

FIG. 1 illustrates the general principle of a "Time of Flight" method. In FIG. 1, a generator 10 (PULSE) provides a periodic electric signal (for example, square-shaped). This signal powers a light unit 12. An example of a light unit 12 may be a light-emitting diode, or any known lighting device, for example, a laser diode. The signal coming out of light unit 12 is transmitted towards an object 16 and is reflected by this object. The reflected light signal is detected by a light sensor (CAPT) 18. The signal on sensor 18 is thus phase-shifted from the signal provided by the generator by a time period proportional to twice the distance to object 16. Calculation block 20 (DIFF) receives the signals generated by generator 10 and by sensor 18 and calculates the phase shift between these signals to obtain the distance to object 16. SPADs have the advantage of picosecond time resolution so are ideal for the detector of a compact time of flight pixel.

Single-photon avalanche diodes or "SPADs," also called Geiger mode avalanche photodiodes, have a reverse biased p-n junction in which a photo-generated carrier can trigger an avalanche current due to an impact ionization mechanism. SPADs may be designed to operate with a reverse bias voltage well above the breakdown voltage.

SPADs may be operated as follows. At an initial time, the diode is biased to a voltage larger greater than its breakdown voltage. The reception of a photon in the diode junction area starts a current avalanche in the diode, which creates an electric voltage pulse on the anode. The diode is then biased back to a voltage smaller greater than the breakdown voltage, so that the SPAD reacts again to the reception of a photon. SPADs can currently be used in cycles having reactivation periods shorter than 10 ns. Thereby, SPADs can be used at high frequency to detect objects at relatively short distances from the measurement device, for example, distances ranging from a few centimeters to a few tens of centimeters. In different embodiments, different ranges may be supported.

Although most of the following examples are described with respect to the integration of ToF image sensors within a residential, commercial or industrial lighting system the integration of ToF image sensors to other lighting systems may be implemented in other embodiments. For example the integration of ToF image sensors within an automotive lighting system for enabling effective control of adaptive automotive headlights or in a cabin lighting environment can be implemented. Thus for example in some embodiments the ToF image sensors can be used to determine an object distance from the vehicle and the system adaptively control the lighting based on this information.

The integration of the ToF image sensor within the system in some embodiments may feature physically integrating the ToF image sensor within the light unit or within the control unit. In some embodiments the ToF image sensor may be physically separate from the light unit. In some embodiments the integration of the ToF image sensor may be defined by a communication between the ToF image sensor and control unit and/or light unit. The communication may be wired or wireless communication. In some embodiments of the ToF image sensor can be configured to communicate with other ToF image sensors and/or control unit(s) and/or light unit(s) via a communication network. A wireless communication network may communicate using radio frequency communication or light frequency communication.

Figure 2:
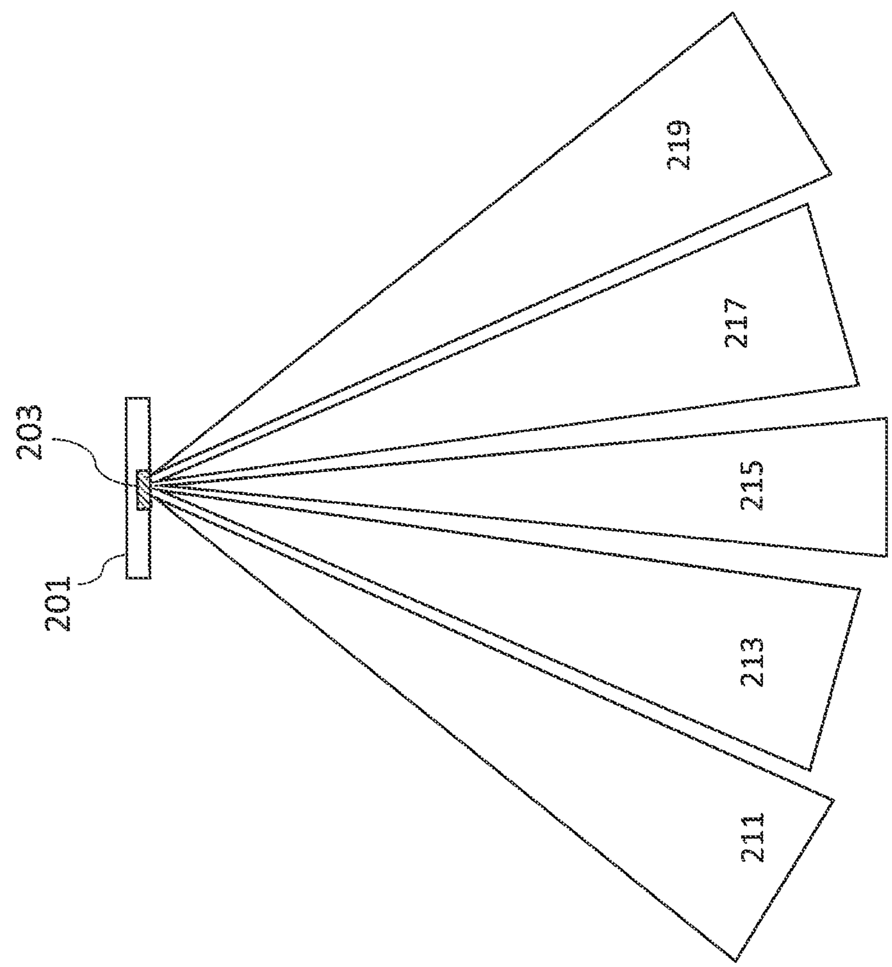
FIG. 2 shows an integrated time-of-flight sensor/light unit apparatus according to some embodiments.

FIG. 2 shows an example light system where the ToF image unit is physically integrated within a light unit is shown in further detail. In this example a light unit (or light source) 201, which may in some embodiments be a pixelated light unit, is shown. Physically integrated within the light unit 201 is shown a multi-zone (or multi-region) ToF image sensor 203. The multi-zone ToF image sensor 203 may be a SPAD device which is configured with multiple arrays of SPADs or a single array of SPADs with multiple regions. Each of the arrays or regions may be configured to determine ToF based distance estimates for separate spatial regions or zones. This is shown in FIG. 2 by the ToF image sensor 203 having multi-zone field-of-views shown by cones 211, 213, 215, 217, and 219.

Furthermore, in some embodiments, the light unit 201 further comprises a control unit which is configured to control the light unit (for example, to control the light output intensity, light pattern, light temperature etc.) based on the information from the ToF image sensor.

In some embodiments the light unit 201 comprises multiple light generating units which may map onto the ToF image sensor multi-zone field of views. This map may for example be a 1:1 map, such that with respect to FIG. 2 the light unit 201 comprises five separate light generating units each with a projection pattern which matches an associated ToF image sensor zone. However in some embodiments the light unit output and the time-of-flight image sensor zones are not mapped on each other using a one to one relationship.

In some embodiments the light unit 201 control unit comprises at least one processor configured to run software code or is firmware which is configured to receive at least one input from the ToF image sensor 203. The processor may be configured to perform target or object presence detection and/or target or object motion predication. The control unit may then generate suitable control signals to enable the light unit to adapt its output. For example the light unit may switch on or off the light generating units based on the ToF image sensor output such that an object of sufficient height triggers the light generating unit to switch on (and thus reduce the number of false positive triggers).

Similarly in some embodiments the intensity level of the light generating unit may be controlled such that the light generating unit generates a first light intensity when an object is detected close to the light unit and a second light intensity when the object is detected far from the light unit. Thus in such an example a person standing close to the light unit is not dazzled by a very strong light and a person standing far from the light unit is provided with a sufficient amount of light.

Furthermore in some embodiments the color or temperature of the light generating unit may be controlled such that the light generating unit generates a first color when an object is detected at a first distance and a different color when an object is detected at a second distance. Thus in such an example a 'correct' distance or position may be determined by a user of the system when the light changes to a defined 'correct' color.

Where the light unit is a pixelated light unit or may be adapted to generate controllable patterns of light in some embodiments the generated light pattern may be controlled such that the light generating unit generates a light pattern based on the ToF image sensor information. For example in some embodiments the light pattern generated may illuminate the area around the object without directly illuminating the detected object and thus prevent the light system from dazzling the user. Furthermore in some examples areas of a room with no target or object can remain unlit by controlling the light pattern generated by the light generating unit.

In some embodiments the controller can furthermore predict motion of objects from the ToF image sensor data and control the light generating units or light unit pattern such that the room or area is illuminated in regions where the object is about to move to and thus illuminate the predicted path in front of the object. This for example with respect to the example shown in FIG. 2, the light unit 201, having determined a person entering passing through the far left zone 211 and entering the near left zone 213 may be configured to illuminate the mid zone 215 in advance of the person entering it. Furthermore as the person enters the mid zone 215 the light unit may illuminate the near right zone 217 in advance and switch off or reduce the illumination for the far left zone 211.

Figure 3:
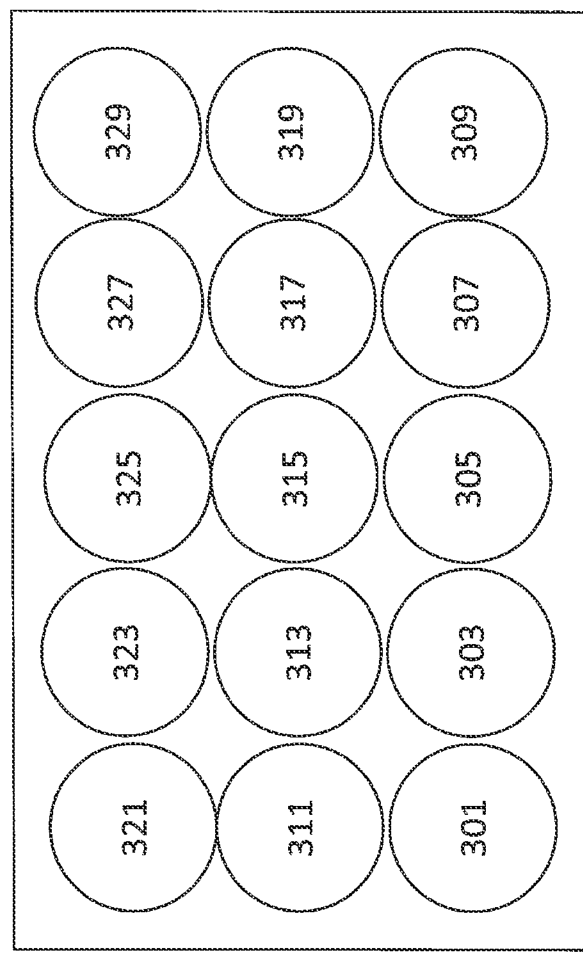
FIG. 3 shows an example plan view of a sensor region arrangement generated by an example time-of-flight sensor within the integrated time-of-flight sensor/light unit apparatus as shown in FIG. 2.

FIG. 3 shows a plan view of an example of a multi-zone (or multi-region) array coverage. This arrangement includes 15 zones arranged in a 5 columns by 3 rows regular array of zones. Thus in FIG. 3 there is shown a first (bottom) row of zones 301, 303, 305, 307, and 309, a second (middle) row of zones 311, 313, 315, 317 and 319, and a third (upper) row of zones 321, 323, 325, 327, and 329. Thus in some embodiments the ToF image sensor may be configured to determine ranges to objects measured in a single dimension such as shown in FIG. 2 but also in two dimensions such as shown in FIG. 3.

Although the examples shown in FIGS. 2 and 3 show a 'regular' arrangement of zones and that each zone has a similar 'field-of-view' range it is understood that the ToF image sensor can be configured to detect the range or distance from the sensor for zones which are arranged in an irregular arrangement. Furthermore although FIG. 3 shows that each zone is substantially equal in size in some embodiments the zones may be larger or smaller than other zones covered by the ToF image sensor and may have differing shaped 'field-of-view' configurations.

Figure 4:
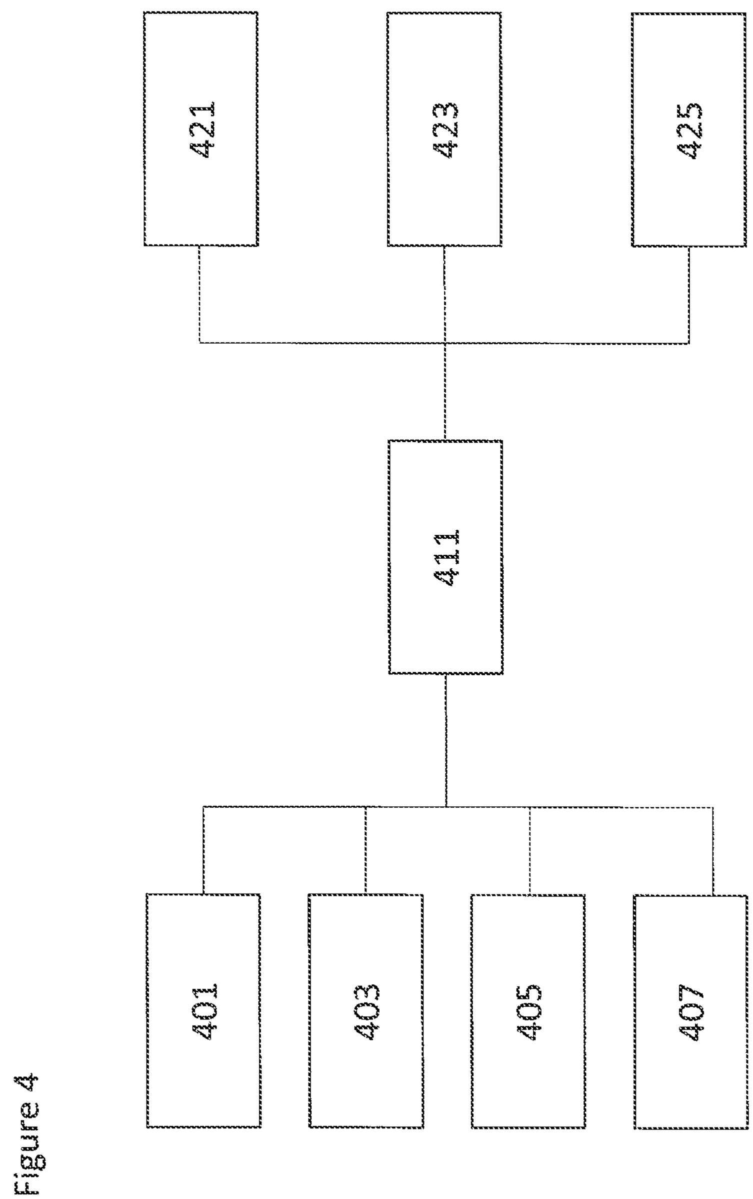
FIG. 4 shows a schematic view of a system implementing an integration of time-of-flight sensors, light unit apparatus and a central control unit according to some embodiments.

FIG. 4 shows a schematic view of an integrated light system comprising a distributed network of ToF image sensors, control unit and light units. As shown in FIG. 4 an array of ToF image sensors 401, 403, 405, and 407 are shown coupled to a control unit 411. The ToF image sensors may be the same or be different. Furthermore each ToF image sensor may have one or multi-zone detection capability. The information from each of the ToF image sensors 401, 403, 405 and 407 can be passed to the control unit 411. The coupling between the ToF sensor units and the control unit may be any suitable data connection and as discussed earlier be wired, wireless, radio frequency or light frequency based.

The controller unit 411 may be physically separate from the ToF image sensors or be physically integrated within one or more of the ToF sensor units and/or the light units. In some embodiments the control unit 411 functionality may be provided by a 'cloud' based server. As described previously the controller unit 411 may be configured to receive the ToF image sensor information and determine lighting parameters such as pattern, intensity, color or otherwise and generate control signals with may be passed to the light units 421, 423, and 425 shown in FIG. 4 via a separate communications network. In some embodiments, the communications network coupling the light units with the control unit is the same as the communications network coupling the control unit with the ToF image sensors.

The light units 421, 423 and 425 may be light units configured to receive suitable lighting control signals and then adapt the light or illumination generated by the light units (or light generating units) based on the control signals. The light units in some embodiments may be located within the same room or scene or in different rooms or scenes. Thus for example in some embodiments the light unit in a room may be controlled based on information from a ToF image sensor located and monitoring a neighboring room such that the light in the room may be switched on just before a person enters the room.

Figure 5:
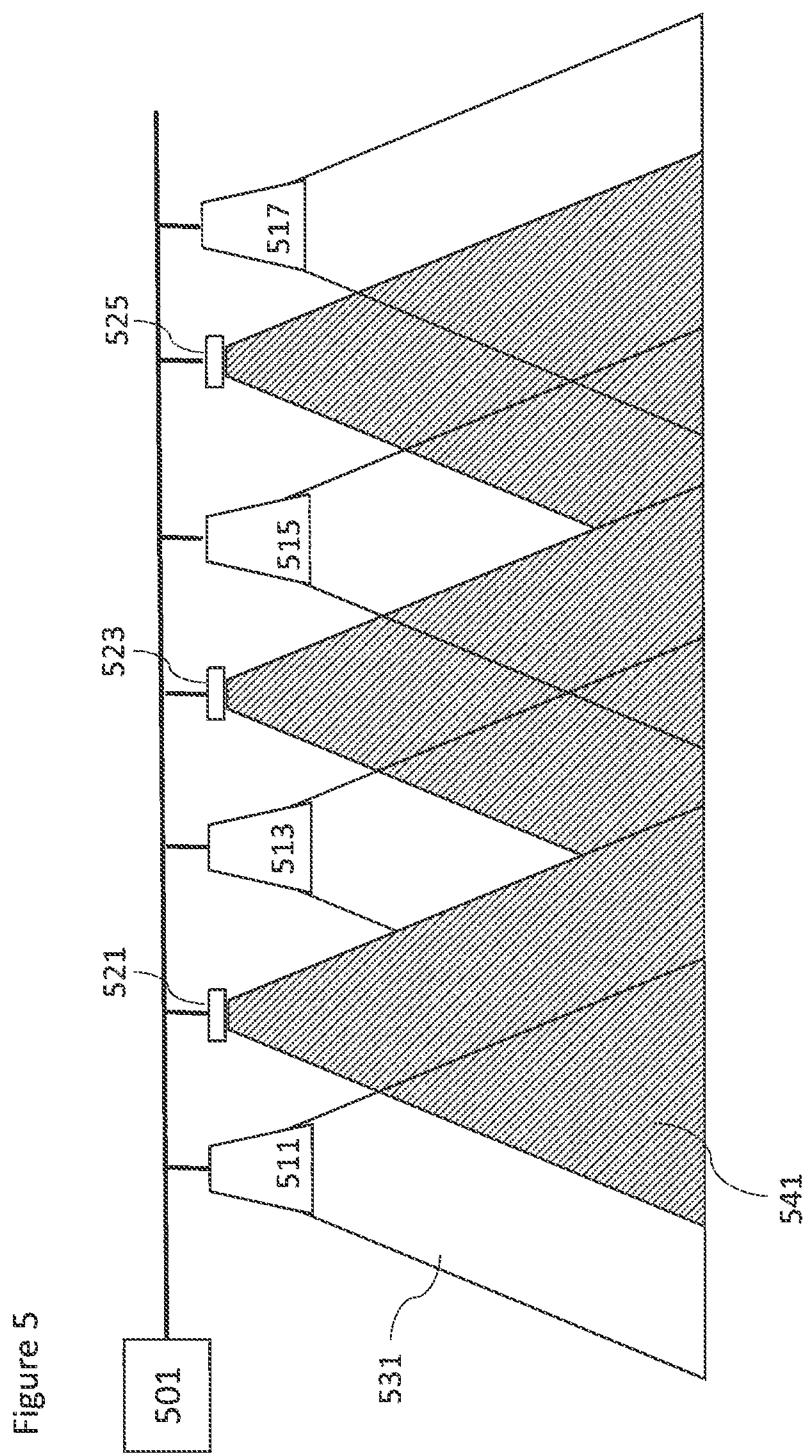
FIG. 5 shows an example elevation view of a sensor region arrangement generated by an example integrated system shown in FIG. 4.

FIG. 5 shows a further example of an integrated lighting system. The integrated lighting system shows a control unit 501 which is networked to an array of light units and Time-of-Flight image sensors. The light units 511, 513, 515, and 517 each have a light unit projection range (shown in FIG. 5 by like light unit 511 having the cone 531). The light units are coupled via a communications network to the control unit 501. The ToF image sensors 521, 523, 525 furthermore are configured to communicate with the control unit 501 over the communications network. The ToF image sensors are arranged to be physically discrete from the light units and located between the light units such that a first ToF image sensor 521 is located between the light units 511 and 513, a second ToF image sensor 523 is located between the light units 513 and 515 and a third ToF image sensor 525 is located between the light unit 515 and 517. This arrangement generates a ToF image sensor field of view which covers the majority of the light unit illuminated areas.

Figure 6:
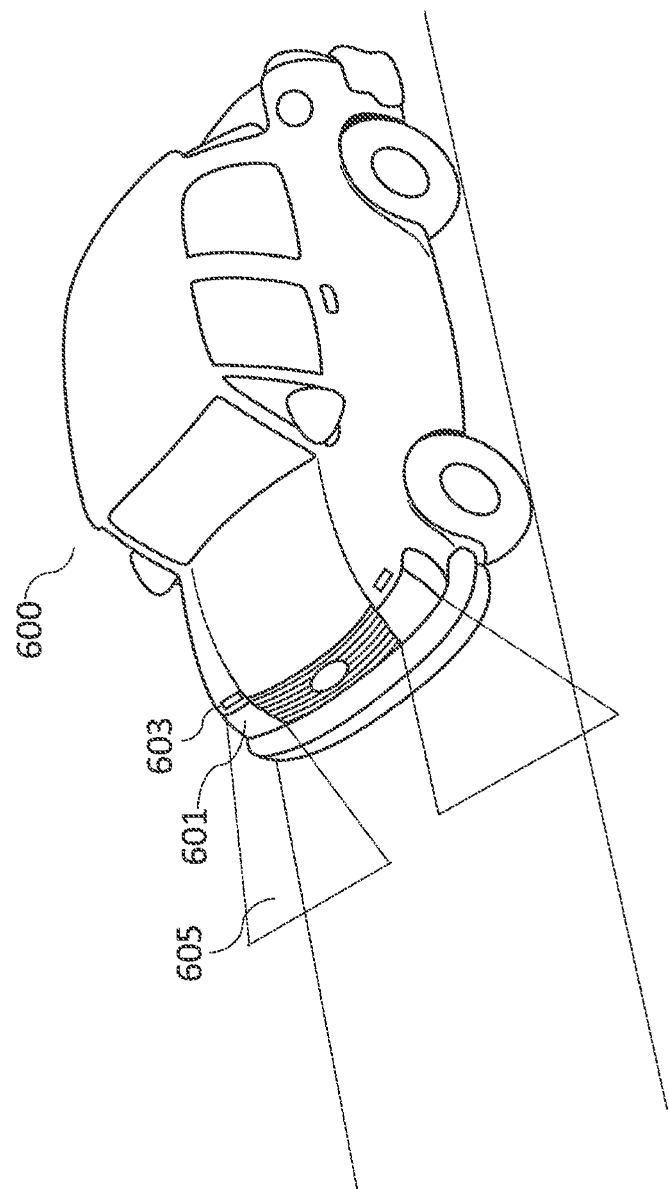
FIG. 6 shows a schematic view of an example integrated system within an automotive implementation.

FIG. 6 shows an example of an integrated light system suitable for a vehicular or automotive application. A vehicle 600 may be equipped with a light unit 601 which is integrated with a Time-of-Flight image sensor 603 such that the ToF image sensor 603 is configured to monitor the area in front of the vehicle 600 and determine at least one distance measurement from the vehicle 600. The ToF image sensor 603 may be configured to generate multi-zone distance determination.

The ToF image sensor 603 information is passed to a control functionality (which may be separate from or physically integrated within the ToF image sensor 603 and/or the light unit) and which is configured to adjust or adapt the output from the light unit 601. For example in some embodiments the light unit 601 may be configured to adjust or adapt the illumination pattern 605 (or light cone generated by the light unit) with respect to shape, intensity, or color based on the information from the ToF image sensor 603.

Some embodiments may use other sensors, instead of SPADs. These sensors may be integrating photo-sensitive elements capable of receiving light intensity, time of arrival, frequency or phase or amplitude/intensity modulation, wavelength (color) or other information.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

What is claimed is:

1. A light system comprising:

a time-of-flight image sensor configured to generate a zone distance measurement;

a control unit configured to receive the zone distance measurement and to generate a control signal based on the zone distance measurement; and a light unit configured to adapt an output of the light unit based on the control signal, wherein the time-of-flight image sensor comprises a distributed network of time-of-flight image sensors and the light unit comprises a distributed network of light units, wherein each of the distributed network of time-of-flight image sensors is arranged to be physically discrete from each of the distributed network of light units and located between adjacent ones of the distributed network of light units.

2. The light system as claimed in claim 1, wherein the time-of-flight image sensor is physically integrated within the light unit.

3. The light system as claimed in claim 1, wherein the time-of-flight image sensor is physically integrated within the control unit.

4. The light system as claimed in claim 1, wherein the time-of-flight image sensor is further configured to generate multiple zone distance measurements, wherein the zone distance measurements are arranged in a determined spatial arrangement.

5. The light system as claimed in claim 4, wherein the determined spatial arrangement comprises a linear array of spatial measurement zones.

6. The light system as claimed in claim 4, wherein the determined spatial arrangement is a regular two dimensional array of spatial measurement zones.

7. The light system as claimed in claim 4, wherein the determined spatial arrangement is an irregular two dimensional array of spatial measurement zones.

8. The light system as claimed in claim 1, wherein the light unit is configured to adapt a light intensity output based on the control signal, a light color output based on the control signal, or a light pattern output based on the control signal.

9. The light system as claimed in claim 1, wherein the light unit is a pixelated light unit.

10. The light system as claimed in claim 1, wherein the time-of-flight image sensor comprises an array of single photon avalanche diodes.

11. The light system as claimed in claim 1, wherein each of the distributed network of time-of-flight image sensors is configured to produce a zone distance measurement corresponding to a first field of view, wherein each of the distributed network of light units is configured to illuminate a second field of view, wherein the first field of view of each of the distributed network of time-of-flight image sensors overlaps with two of the second field of views of adjacent light units of the distributed network of light units.

12. A light system comprising:

a multi-zone time-of-flight image sensor configured to generate a plurality of zone distance measurements, each zone distance measurement corresponding to a field of view; and a light unit with a plurality of light sources, each light source corresponding to field of view and configured to output light that includes characteristics based on the zone distance measurement of the corresponding field of view, wherein the light unit comprises a pixelated light unit and wherein the multi-zone time-of-flight image sensor is embedded inside the pixelated light unit.

13. The light system as claimed in claim 12, further comprising a control unit operationally coupled to the multi-zone time-of-flight image sensor and the light unit.

14. The light system as claimed in claim 13, wherein the control unit is physically integrated with the multi-zone time-of-flight image sensor.

15. The light system as claimed in claim 13, wherein the distributed network of light units are coupled through a communication network to the control unit.

16. The light system as claimed in claim 12, wherein the light system is part of a headlight for an automotive vehicle.

17. The light system as claimed in claim 12, wherein the multi-zone time-of-flight image sensor is further configured to generate multiple zone distance measurements, wherein the zone distance measurements are arranged in a non-linear spatial arrangement.

18. The light system as claimed in claim 12, wherein the multi-zone time-of-flight image sensor is further configured to generate multiple zone distance measurements, wherein the zone distance measurements are arranged in a two-dimensional array of spatial arrangement.

19. A method for controlling a light system, the method comprising:

generating a zone distance measurement using a time-of-flight image sensor;

generating a control signal based on the zone distance measurement; and adapting an output of a light unit based on the control signal, wherein the time-of-flight image sensor comprises a distributed network of time-of-flight image sensors and the light unit comprises a distributed network of light units, wherein each of the distributed network of time-of-flight image sensors is arranged to be physically discrete from each of the distributed network of light units and located between adjacent ones of the distributed network of light units.

20. The method as claimed in claim 19, wherein generating the zone distance measurement comprises generating multiple zone distance measurements, wherein the zone distance measurements are arranged in a determined spatial arrangement.

21. The method as claimed in claim 20, wherein the determined spatial arrangement is a linear array of spatial measurement zones, a regular two dimensional array of spatial measurement zones, or an a regular two dimensional array of spatial measurement zones.

22. The method as claimed in claim 19, wherein adapting the output of the light unit comprises adapting a light intensity output of the light unit.

23. The method as claimed in claim 19, wherein adapting the output of the light unit comprises adapting a light color output of the light unit.

24. The method as claimed in claim 19, wherein adapting the output of the light unit comprises adapting a light pattern output of the light unit.

* * * * *